April 20, 1965  J. G. BAKER  3,179,827
MOTOR MOUNTS FOR PITLESS WELL CONSTRUCTION
Filed Dec. 14, 1961  2 Sheets-Sheet 1

JOHN GORDON BAKER
INVENTOR.

BY *Joseph G. Werner*
ATTORNEY

April 20, 1965  J. G. BAKER  3,179,827
MOTOR MOUNTS FOR PITLESS WELL CONSTRUCTION
Filed Dec. 14, 1961  2 Sheets-Sheet 2

JOHN GORDON BAKER INVENTOR.

BY *Joseph G. Werner*

ATTORNEY

United States Patent Office 3,179,827
Patented Apr. 20, 1965

3,179,827
MOTOR MOUNTS FOR PITLESS WELL
CONSTRUCTION
John Gordon Baker, Evansville, Wis., assignor to Baker
Manufacturing Company, Evansville, Wis., a corporation of Wisconsin
Filed Dec. 14, 1961, Ser. No. 159,305
3 Claims. (Cl. 310—91)

This invention relates to improvements in motor mounts for pitless well construction or other motor installations, and is a continuation-in-part of my co-pending application Serial No. 800,150, now Patent Number 3,051,088 filed March 18, 1959, for Pitless Pump Construction, which is an improvement on my invention disclosed in U.S. Patent No. 2,657,637.

It is a primary object of my invention to provide a motor pump mount for quick removal and replacement of the motor as a part of the priming procedure of a pitless pump.

It is a further object of the invention to provide a motor mount which allows for more compact mounting of a motor on a casing.

It is an additional object of my invention to provide a motor mount for improved alignment of a motor with a pump drive shaft assembly.

It is a still further object of my invention to provide a mount for a motor on a casing which will sustain the motor torque reaction without transmitting high frequency noise causing torsional vibration of the (single phase) motor, despite fabrication variance in the length of the casing.

It is another object of my invention to provide a motor mount which permits quick removal and replacement of the motor on a casing without loose parts which may be dropped into the casing.

Other objects and advantages will be apparent from the following detailed description taken in conjunction with the accompanying drawings wherein preferred embodiments of the improvement have been selected for exemplification.

Figure 1:
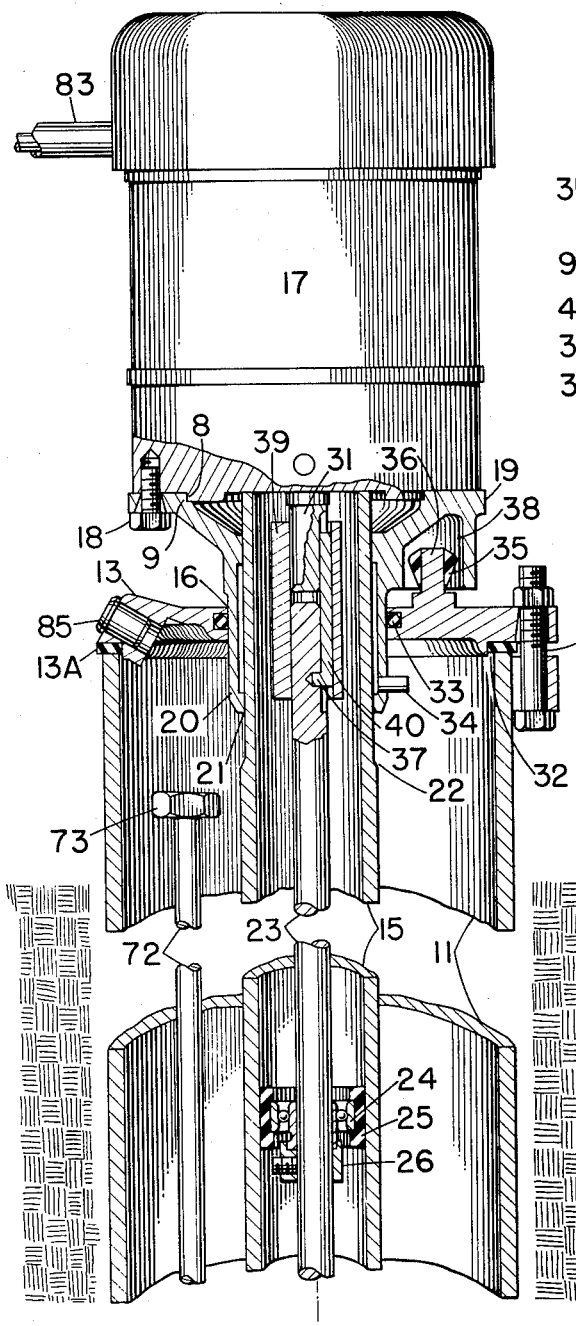
FIG. 1 is a fragmentary vertical full section through my motor mount and a portion of a pitless pump installation to which it is attached.

The well construction includes a pump which may be of the jet type as shown in my U.S. Patent No. 2,657,637. The construction also includes a tubular casing made up of three parts, a lower casing 10, an upper casing 11 and a discharge body 12 all threaded together. The upper casing 11 has a cap 13 which is secured to the casing by means of the bolts 14. The shaft housing 15 extends through the opening 16 of the cap 13. The pump drive motor 17 rests on the shaft housing 15 and is secured by the bolts 18 to the motor mount 19. The motor 17 has a machined base and male diameter 8 which fits a corresponding machined flange and female diameter 9 of the motor mount 19 as shown in FIG. 1. The motor mount 19 includes the neck 20, the bore 21 of which is coaxial with the flange face and female diameter 9 and, by virtue of the flange fit with the motor, is coaxial with the motor shaft 31. The neck 20 slidably fits around a turned diameter 22 of the shaft housing 15 which is coaxial with the inside diameter of 15. Thus the motor shaft axis and the axis of the inside diameter of the shaft housing 15 are aligned.

The middle shaft 23 extends through bearings such as 24 which are spaced along the axis of the shaft 23 and supported within the shaft housing 15 by the rubber bushing 25 which fits snugly around the bearing 24 and snugly within the shaft housing 15. The shaft 23 and the inside diameter of 15 are thereby made coaxial. The bearing 24 is bound to the middle shaft 23 by means of an eccentric bushing 26 as is well known in the art. The shaft housing 15 has an accurately machined lower end and is accurately threaded into the hollow spool 27 and tightened against the ring 28 and the accurate shoulder 29 thus aligning the axes of the inside diameter of the shaft housing 15 and the pump shaft 30. Since other fits already described align the motor shaft 31 and the middle shaft 23 with the inside diameter of the shaft housing 15, it follows that all shafts are in alignment.

The radial clearance 32 between the cap 13 and the inside diameter of the upper casing 11 permits the radial location of 13 on the casing 11 by the motor mount 19 before the bolts 14 are tightened. Thus eccentricity of the axis of the upper casing 11 with respect to the impeller axis, due to fabrication errors in alignment of the casing assembly, does not cause misalignment of the motor shaft with respect to the impeller. Moreover, substantial fabrication variance in length of the upper casing 11 can be tolerated because considerable vertical displacement of the cap 13 with respect to the motor mount 19 does not impair operation of the motor.

The cap 13 is sealed to the outside diameter of 19 by the ring 33 of a yieldable material such as rubber to exclude foreign matter from the well. A gasket 13a of similarly yieldable material is preferably located between the cap 13 and the upper casing 11. If venting of the well is necessary the steel push-in plug 85 may be removed from the cap 13 and replaced with a vent pipe of construction well known in the art. The pin 34 discourages vandalistic removal of the motor 17.

The rubber ring 35 surrounds the boss 36 extending up from the cap 13. The cavity 38 within the motor mount 19 surrounds the rubber ring 35 so that rotation of the motor frame about the motor shaft axis is prevented and the torque reaction from the motor is sustained. The yielding of the rubber ring 35 prevents transmission of torsional vibration of the motor frame, which is particularly pronounced when the single phase type of motor is used, and thus eliminates noise which would result if the restraint were rigid.

The motor shaft 31 extends from the motor 17 into the coupling 39 with a slide fit. Relative rotations of the shafts 31 and 23 and the coupling 39 are prevented by the tit-key 40. The middle shaft 23 is pressed into the coupling 39. The tit 37 of the tit-key 40 prevents withdrawl of the key when the motor shaft 31 is withdrawn. The middle shaft 23 and the pump shaft 30 are similarly coupled and keyed together. The pump shaft 30 extends through the pump bearing 47 to the pump impeller 49. The impeller 49 is of construction similar to that shown in U.S. Patent No. 2,657,637. The impeller 49 is located within the pump chamber 50 which is part of hollow spool 27.

The pipes 59 and 60 are threaded into corresponding openings in the bottom of the spool 27 and extend down into the well where they are coupled to the nozzle-venturi combination shown in my co-pending application Serial No. 800,150.

A delivery pipe 61 is attached to the discharge body 12 and, in the typical case, extends into the dwelling (not shown) to a T connection 63 for a pressure gauge 64. The pipe 61 continues to a pressure regulating valve and a pressure tank (not shown), of a type well known to the art, from which the water is drawn as needed for use.

The upper flange 56 of the spool 27 has an aperture 67 which when open connects the upper chamber 68 with the outlet recess 69. The outlet recess 69 is in communication with the pipe 60 through the passage 70 and also in communication with the discharge pipe 61. The lower end 71 of the closure rod 72 may be used to tightly close the aperture 67. The closure rod 72 at its upper end is preferably formed into a hexagonal head 73, which is adapted to facilitate rotation with a wrench inserted above when the cap, motor mount and motor are removed. A second aperture 74, in the flange 56, which is open when the pump is in operating condition, connects the upper chamber 68 with the drain passage 45 in the spool. Drain passage 45 communicates with the lower chamber 46. The aperture 74 is preferably threaded with the same thread as used in the aperture 67 so that the closure rod 72 may be screwed into either aperture.

Figure 2:
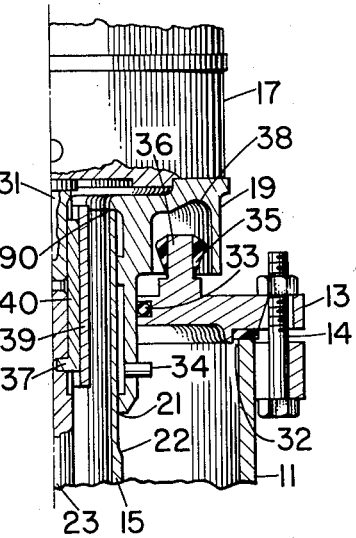
FIG. 2 is a half section view of a modified form of my motor mount attached to a pitless pump casing.

FIG. 2 shows a modification of my motor mount 19 having a shoulder 90 which rests on the top of the shaft housing 15 to vertically position the motor mount. This modification has been adapted to fit all standard jet pump motors so that all motors are mounted at the same height with respect to the shaft housing 15.

Figure 3:
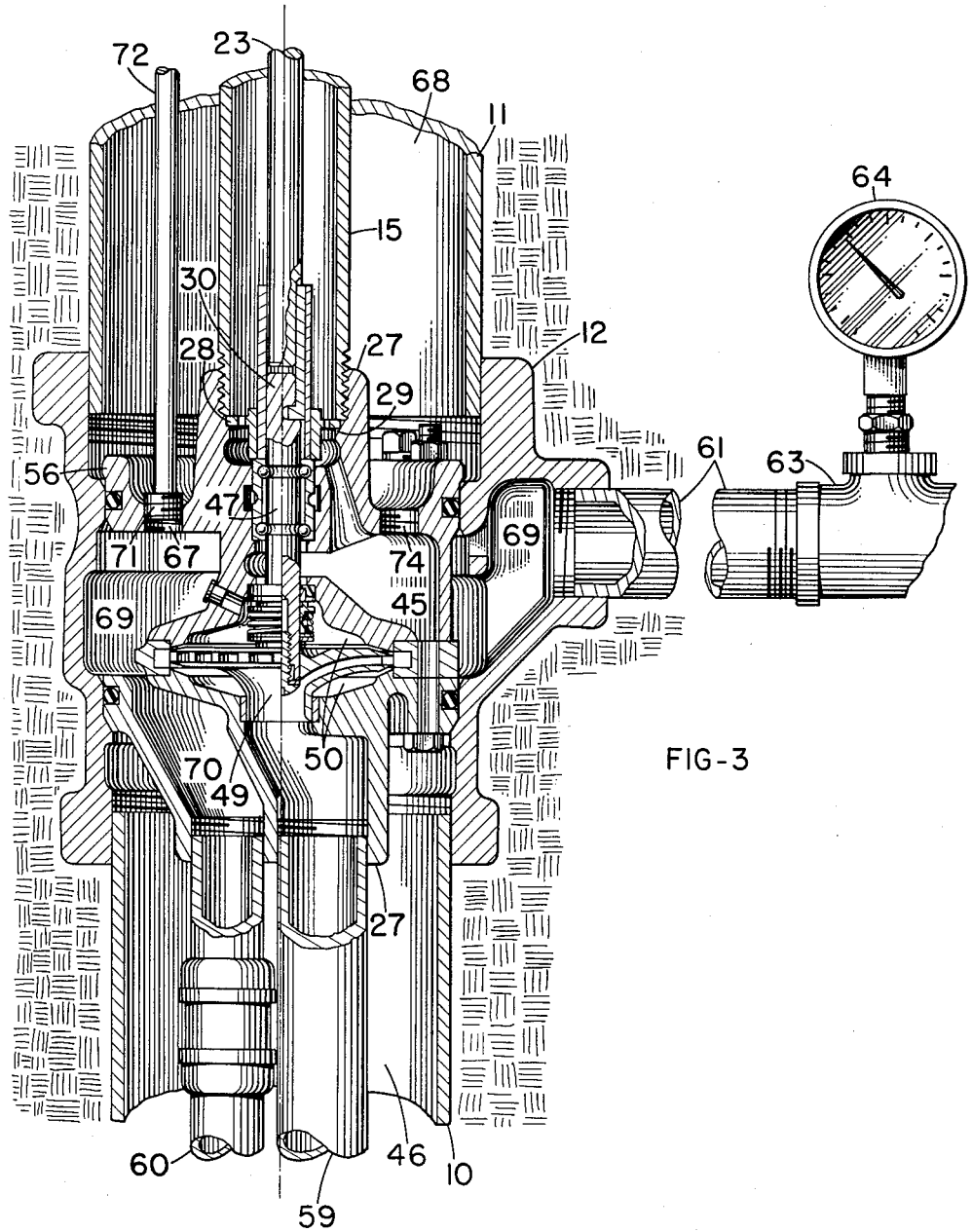
FIG. 3 is a fragmentary vertical full section through another portion of a pitless pump installation to which my motor mount may be attached.

In the operating condition, the closure rod 72 is tightly inserted into the aperture 67 and the aperture 74 is open as shown in FIG. 3. With the motor rotating the impeller 49, water is raised from the well in the pipe 59 by action of the nozzle-venturi combination and is forced by the impeller into the outlet recess 69 where the flow is divided, with part returning to the nozzle-venturi combination to sustain the jet and the balance flowing through the outlet recess 69 to discharge pipe 61 to the pressure tank (not shown).

In order to prime the pump, the bolts 14 are removed and the motor 17 is lifted off. (Disconnecting of the motor leads 83 is not necessary.) The motor mount 19 and cap 13 lift off with the motor. The coupling 39 and key 40 remain with the shaft 23. Now, the closure rod 72 is unscrewed from the aperture 67 and inserted into the aperture 74. Next, sufficient clean water is poured into the upper casing 11 to continue the flow into the aperture 67 until such flow substantially stops. Excess water is desirable to use hydrostatic pressure to speed the filling process.

Next the pressure gauge 64 is removed. If water runs out of the hole from which the pressure gauge was removed, the gauge is immediately replaced. On the other hand, if no water appears, the hole is filled with clean water and the pressure gauge is then replaced. After time enough has elapsed for the pipes to fill, the closure rod 72 is removed from the aperture 74 and replaced in the aperture 67, after which the motor is replaced and the pump started. The opening of the aperture 74, of course, drains the excess priming water through the drain passage 45 and into the lower chamber 46, i.e., into the well.

It is apparent that my motor mount can be used with other installations than pitless pump installations and it should not be limited thereto. The present invention is not confined to the particular construction, position and arrangement of parts herein illustrated and described, but embraces all such modified forms thereof as come within the scope of the following claims.

I claim:

1. In a pump installation having an upright casing and having an upwardly extending motor with a base and a downwardly extending rotatable motor shaft, an improvement for removably attaching said motor to said casing comprising, a cap with an aperture attached to said casing in removable relation, a shaft housing extending through said aperture coaxial with said motor shaft, a drive shaft located within said shaft housing withdrawably coupled with and coaxial to said motor shaft, a motor mount attached to said motor base and having a downwardly extending hollow cylindrical neck said neck being slidably engaged around said shaft housing and extending within said cap aperture, means on said cap for engaging said cylindrical neck in close relation, a boss extending upward from said cap, a chamber extending downward from said motor mount to engage said boss and angularly locate said motor, said motor and motor mount being removable with said cap from said casing.

2. The improvement of claim 1 wherein said cylindrical neck extends below said cap and wherein a removable pin extends outward from said neck to prevent said motor mount and attached motor from being removed from said casing without removing said cap.

3. The improvement of claim 1 wherein a shoulder extends inward from the inside of said hollow neck, said shoulder resting on the top of said upright casing to support said motor mount and attached motor.

References Cited by the Examiner
UNITED STATES PATENTS 2,435,470 2/48 Samelson _____ 103—87
2,928,961 3/60 Morrill _____ 310—91

MILTON O. HIRSHFIELD, *Primary Examiner*.